United States Patent Office 3,751,337
Patented Aug. 7, 1973

3,751,337
PROCESS FOR PRODUCING CELLS
OF MICROORGANISMS
Katsunobu Tanaka, Kazuo Kimura, and Masaki Yamamoto, Machida, Japan, assignors to Kyowa Hakko Kogyo Co., Ltd., Tokyo, Japan
No Drawing. Continuation of abandoned application Ser. No. 803,420, Feb. 28, 1969. This application Nov. 1, 1971, Ser. No. 194,483
Int. Cl. C12b 1/00
U.S. Cl. 195—28 R
9 Claims

ABSTRACT OF THE DISCLOSURE

The present disclosure is directed to a process for producing microorganism cells using microorganisms having a gaseous hydrocarbon-assimilating property and belonging to the genera Nocardia, Corynebacterium and Brevibacterium which comprises culturing said microorganisms in an aqueous nutrient medium, under aerobic conditions in the presence of at least one gaseous hydrocarbon as the main carbon source, and isolating and recovering the resultant microorganism cells thus produced. The gaseous hydrocarbons include ethane, propane and butane.

---

This is a continuation of application Ser. No. 803,420, filed Feb. 28, 1968, now abandoned.

The present invention relates to a process for producing cells of microorganisms by conducting the culturing under aerobic conditions using gaseous hydrocarbons as the main carbon source.

Recently, microorganisms which utilize hydrocarbons in the fermentation medium have been used for industrial production. Aiming at the utilization of gaseous hydrocarbons which are the most inexpensive and abundant hydrocarbons, and examining various processes, the present inventors have succeeded in obtaining from nature microorganisms belonging to the genera Nocardia, Corynebacterium and Brevibacterium having excellent utilizability of gaseous hydrocarbons.

One of the objects of the present invention is to provide an improved process for producing microorganism cells using new species of microorganisms belonging to the genera Nocardia, Corynebacterium, and Brevibacterium.

Another object of the present invention is to provide a process for producing microorganism cells by culturing new species of microorganisms belonging to the genera Nocardia, Corynebacterium and Brevibacterium in the presence of gaseous hydrocarbons as the main carbon source which may be carried out in an efficacious and simple manner.

A further object of the present invention is to provide a process for producing microorganism cells using new species of microorganisms which can be carried out advantageously and inexpensively on an industrial scale to give a high yield of product.

Other objects and further scope of applicability of the present invention will become apparent from the detailed description given hereinafter; it should be understood, however, that the detailed description and specific examples, while indicating preferred embodiments of the present invention, are given by way of illustration, since various changes and modifications within the spirit and scope of the invention will become apparent to those skilled in the art from this detailed description.

Pursuant to the present invention, cells of microorganisms are produced using new species of microorganisms by culturing a microorganism having a gaseous hydrocarbon-assimilating property and belonging to the genus Nocardia, Corynebacterium or Brevibacterium in an aqueous nutrient medium under aerobic conditions in the presence of at least one gaseous hydrocarbon as the main carbon source.

Microorganisms employed in the present invention are bacteria having a remarkable ability to assimilate gaseous hydrocarbons and which grow by utilizing gaseous hydrocarbons as the main carbon source. Their growing velocities are very significant when compared with those of bacteria which assimilate gaseous hydrocarbons, for example methane-assimilatory bacteria, heretofore reported. The culturing method used in connection with the present microorganisms is considered to be a very superior means for obtaining microorganism cells or the protein of microorganism cells utilizing gaseous hydrocarbons. The thus obtained microorganism cells are useful as a protein source, an amino acid source, a nucleic acid source, a vitamin source and the like.

As microorganisms employed in the present invention, any of the microorganisms belonging to the genera Nocardia, Corynebacterium and Brevibacterium which are capable of assimilating gaseous hydrocarbons may be used. In first considering the genus Nocardia, both Nocardia paraffinica, ATCC 21198 and ATCC 21199 and Nocardia butanica, ATCC 21197 have been isolated from soil and their microbiological properties are shown as follows:

(I) Nocardia paraffinica, ATCC 21198 and ATCC 21199

(A) Morphological properties:
  (1) Form of microorganism: Usually short rod; young cells shows the mycelium state; branching and comparatively long cells are found. Formation of spores depends on breaking up of the mycelium.
  (2) Size: 0.5–0.75 x 2.5–16.0 micron
  (3) Motility: Non-motile
  (4) Spore: Formed
  (5) Flagellum: Not formed
  (6) Gram-staining: Positive
  (7) Acid fast staining: Positive
(B) Culturing properties:
  (1) Growth is slightly slow in a bouillon agar plate culture, and it shows a circular, rugose, undulate, umbilicate, and is yellowish red, lusterless and opaque.
  (2) In a bouillon agar slant culture, growth is scanty and it shows a filiform, lusterless, yellowish red, odorless, brittle and the culture medium is not changed.
  (3) In a bouillon culture, the growth of the surface is membraneous, turbidity is scarcely found and no sediment is found.
  (4) In a gelatin stab culture, the growth in the upper part is more excellent than the lower part and no liquefaction is shown.
(C) Physiological properties:
  (1) Optimum temperature: 25°–37° C. (slight growth of 42° C.).
  (2) Optimum pH: 6.0–9.0.
  (3) Oxygen requirement: Aerobic.
  (4) Litmus milk: Not changed or alkaline.
  (5) Hydrogen sulfide: Produced.
  (6) Indole: Not produced.
  (7) Starch: Not decomposed.
  (8) Nitrate is reduced.
  (9) Catalase: Positive.
  (10) Production of ammonium: Negative.
  (11) Voges-Proskauer test: Negative.
  (12) Utilization of sugars: Acid produced from glucose, fructose, mannose, sucrose, mannitol and sorbitol.
  (13) Assimilatory properties of hydrocarbons: Assimilate ethane, propane, n-butane, n-dodecane, n-tridecane, n-tetradecane, n-pentadecane, n-hexadecane, and n-heptadecane. Nocardia paraffinica ATCC 21198 and ATCC 21199 are different, so far as studied, only in the consistency of the agar slant. ATCC 21198 is brittle, while ATCC 21199 is butyrous.

(II) *Nocardia butanica*, ATCC 21197

(A) Morphological properties:
(1) Form of microorganisms: Usually short rod; young cells show mycelium state; branching and comparatively long cells are recognized. Formation of spores depends on breaking up of the mycelium.
(2) Size: 0.5–0.75 x 2.5–16.0 micron.
(3) Motility: Non-motile.
(4) Spore: Formed.
(5) Flagellum: Not formed.
(6) Gram-staining: Positive.
(7) Acid fast staining: Positive.
(B) Culturing properties:
(1) In a bouillon agar plate culture, the growth is a little slow and it shows a circular, rugose, undulate, umbilicate, and is dull red, lusterless and opaque.
(2) In a bouillon agar slant culture, the growth is scanty, filiform, lusterless, dull red, odorless, brittle and the culture medium is not changed.
(3) In a bouillon culture, the growth of the surface is membraneous and the broth is almost clear and no-sediment is found.
(4) In a gelatin stab culture, the growth in the upper part is more excellent than that of the lower part and gelatin liquefaction is not found.
(C) Physiological properties:
(1) Optimum temperature: 25°–35° C. (slight growth at 42° C.).
(2) Optimum pH: 6.0–9.0.
(3) Oxygen requirement: Aerobic.
(4) Litmus milk: Not changed or alkaline.
(5) Hydrogen sulfide: Produced.
(6) Indole: Not produced.
(7) Starch: Not decomposed.
(8) Nitrate is reduced.
(9) Catalase: Positive.
(10) Production of ammonium: Negative.
(11) Voges-Proskauer test: Negative.
(12) Utilization of sugars: Acid is procured from glucose, fructose, arabinose, mannose, sucrose, galactose, xylose, mannitol and sorbitol.
(13) Assimilatory property of hydrocarbons: Assimilate ethane, propane, n-butane, n-octane, n-undecane, n-dodecane, n-tridecane, n-tetradecane, n-pentadecane, n-hexadecane, and n-heptadecane.

Taxonomical positions of both microorganisms were determined according to the "Bergey's Manual of Determinative Bacteriology, 7th ed.

Both bacteria belong to the order Actinomycetales because their cells are rigid and in some phase of growth, a branching mycelium-like structure is formed. In this order, they belong to the family Actinomycetaceae because a true mycelium is produced and in addition spores are formed by fragmentation of the mycelium. Moreover, in this family, they belong to the genus Nocardia because they are obligately aerobic and acid fast. In this genus, they are closest to *Nocardia asteroides*, *Nocardia polychromogenes*, *Nocardia caprae* and *Nocardia minima*. As shown in the following table, they are different from *Nocardia asteroides* in their color, growth in glucose medium, and optimum temperature for growth; different from *Nocardia polychromogenes* in color, optimum temperature for growth and action to milk; different from *Nocardia caprae* in growth in a glucose medium and a bouillon medium, production of aerial mycelium, action to milk and acid fast staining; and different from *Nocardia minima* in color, optimum temperature for growth and acid fast staining. Further, these new bacteria have strong assimilatory properties for gaseous hydrocarbons. They are considered to be a new species. They are different from one another in their color, size at the beginning of culturing and utilizability of sugars. Therefore, they have been named *Nocardia paraffinica* and *Nocardia butanica*, respectively.

TABLE I

| | Nocardia asteroides | Nocardia polychromogenes | Nocardia caprae | Nocardia minima | Nocardia paraffinica, ATCC 21198, ATTC 21199 | Nocardia butanica, ATTC 21197 |
|---|---|---|---|---|---|---|
| Color | Light yellow growth, becoming deep yellow to yellowish red. | | | At first colorless. Flesh pink or coral pink in the latter period of growth. | Yellowish red | Dull red. |
| Growth in a glucose medium. | Form thin, yellowish pellicle. | | Small sediment of fine flocculi. Formation of aerial mycelium. | | Form yellowish red pellicle. No No sediment and the broth is almost clear. | Form dull red pellicle. No sediment and the broth is almost clear. |
| Growth in a bouillon medium. | | | Moderate, flocculent sediment. Formation of aerial mycelium. | | Ibid | Ibid. |
| Optimum temperature for growth. | 37° | 22–25° | | 22–25° | 25–37° | 25–35°. |
| Action to milk | | Grow | Solidify | | Not changed | Not changed. |
| Acid fast staining | | | Slight | Most are not acid fast. | Acid fast | Acid fast. |
| Utilizability of sugars: | | | | | | |
| Arabinose | | | | | − | +. |
| Galactose | | | | | − | +. |
| Xylose | | | | | − | +. |

*Corynebacterium alkanum*, ATCC 21194, *Brevibacterium paraffinolyticum* ATCC 21195, and *Brevibacterium butanicum*, ATCC 21196, have all been isolated from soil and their microbiological properties are shown in the following.

(I) *Corynebacterium alkanum*, ATCC 21194

(A) Morphological properties:
(1) Form of microorganisms: Usually short rod; frequently, incomplete fission cells, branching cells, and snapping type fission cells are recognized.
(2) Size: 0.5 x 2.5–5.0 micron.
(3) Motility Non-motile.
(4) Spore: Not formed.
(5) Flagellum: Not formed.
(6) Gram-staining: Positive.
(7) Acid fast staining: Negative.
(B) Culturing properties:
(1) In a bouillon agar plate culture-moderate growth, circular, smooth, entire, convex, yellowish gray, glistening and opaque.
(2) In a bouillon agar slant culture-moderate growth, filiform, glistening, yellowish gray, odorless, butyrous and the culture medium is not changed.

(3) In a bouillon culture, the growth of the surface is faint, and the broth is moderately clouding.

(4) In a gelatin stab culture, the growth is slight in the upper part and no gelatin liquefaction is shown.

(C) Physiological properties:

(1) Optimum temperature: 25°–30° C. The growth is extremely slight at 35° C.

(2) Optimum pH: 5.0–9.0 (no growth at pH 4.0).

(3) Oxygen requirement: Aerobic.

(4) Litmus milk: Not changed or alkaline.

(5) Hydrogen sulfide: Produced.

(6) Indole: Not produced.

(7) Starch: Not decomposed.

(8) Nitrate is reduced.

(9) Catalase: Positive.

(10) Production of ammonium: Negative.

(11) Voges-Proskauer test: Negative.

(12) Utilization of sugars: Acid is produced from glucose, fructose, mannose, sucrose, lactose, mannitol and sorbitol.

(13) Assimilatory property of hydrocarbons: Assimilates propane, n-butane, n-dodecane, n-tridecane, n-tetradecane, n-pentadecane, n-hexadecane and n-heptadecane.

(II) *Brevibacterium butanicum*, ATCC 21196

(A) Morpholgical properties:

(1) Form of microorganism: Usually short rod, frequently incomplete fission cells and snapping-type fission cells are found but branching cells are not recognized.

(2) Size: 0.5 x 3.0–6.0 micron.

(3) Motility: Non-motile.

(4) Spore: Not formed.

(5) Flagellum: Not formed.

(6) Gram-staining: Positive.

(7) Acid fast staining: Negative.

(B) Culturing properties:

(1) In a bouillon agar plate culture-abundant growth, circular, smooth, entire, umbonate, pale brown, dull and opaque.

(2) In a bouillon agar slant culture-abundant growth, echinulate, dull, pale brown, odorless, butyrous and the culture medium is not changed.

(3) In a bouillon culture, the growth of the surface is membraneous, the broth is almost clear and no sediment is found.

(4) In a gelatin stab culture, the growth is best at top and gelatin liquefaction is not found.

(C) Physiological properties:

(1) Optimum temperatures: 25°–30° C. Slight growth at 37° C.

(2) Optimum pH: 6.0–9.0.

(3) Oxygen requirement: Aerobic.

(4) Litmus milk: Not changed or alkaline.

(5) Hydrogen sulfide: Produced.

(6) Indole: Not produced.

(7) Starch: Not decomposed.

(8) Nitrate is reduced.

(9) Catalase: Positive.

(10) Production of ammonium: Negative.

(11) Voges-Proskauer test: Negative.

(12) Utilization of sugars: Acid is produced from glucose, fructose, arabinose, mannose, sucrose, xylose, mannitol and sorbitol.

(13) Assimilatory property of hydrocarbons: Assimilate propane, n-butane, n-decane, n-undecane, n-dodecane, n-tridecane, n-tetradecane, n-pentadecane, n-hexadecane, and n-heptadecane.

(III) *Brevibacterium paraffinolyticum*, ATCC 21195

(A) Morphological properties:

(1) Form of microorganism: Rod, frequently snapping type fission cells are found but branching cells are not found.

(2) Size: 0.5 x 2.5–5.0 micron.

(3) Motility: Non-motile.

(4) Spore: Not formed.

(5) Flagellum: Not formed.

(6) Gram-staining: Positive.

(7) Acid fast staining: Negative.

(B) Culturing properties:

(1) In a bouillon agar plate culture-abundant growth, circular, smooth, entire, convex to capitate, pale pink, glistening and opaque.

(2) In a bouillon agar slant culture-abundant growth, filiform, glistening, yellowish gray, odorless, butyrous and the culture medium is not changed.

(3) In a bouillon culture, the growth of the surface is faint and the broth is moderately clouding.

(4) In a gelatin stab culture, the growth is slight at top. Gelatin liquefaction is not recognized.

(C) Physiological properties:

(1) Optimum temperature: 25°–30° C. The growth is very slight at 35° C.

(2) Optimum pH: 5.0–9.0 (no growth at a pH of 4.0).

(3) Oxygen requirement: Aerobic.

(4) Litmus milk: Not changed or alkaline.

(5) Hydrogen sulfide: Produced.

(6) Indole: Not produced.

(7) Starch: Not decomposed.

(8) Nitrate is reduced.

(9) Catalase: Positive.

(10) Production of ammonium: Negative.

(11) Voges-Proskauer test: Negative.

(12) Utilization of sugars: Acid is produced from glucose, fructose, sucrose, lactose, mannitol and sorbitol.

(13) Assimilatory property of hydrocarbons: Assimilate propane, n-butane, n-undecane, n-dodecane, n-tridecane, n-tetradecane, n-pentadecane, n-hexadecane and n-heptadecane.

The taxonomical position of *Corynebacterium alkanum*, ATTC 21194, was determined by the "Bergey's Manual of Determinative Bacteriology," 7th edition, depending upon the above mentioned properties. It belongs to the family Corynebacteriaceae because of rod cells, not being acid fast, no formation of trichomes, Gram-positive, no fermentation of sugars in anaerobic condition, no formation of endospores and cells forming branching. In this family, it belongs to the genus Corynebacterium because it shows curved and snapping-type fission and catalase-positive. In this genus, Corynebacterium, it is closest to *Corynebacterium agropyri* and *Corynebacterium rathayi* but it is different from *Corynebacterium agropyri* in size, Gram-staining and growth in a bouillon agar slant culture, and different from *Corynebacterium rathayi* in size, growth and gelatin-liquefaction. Moreover, it is different from the above-mentioned two species in its consistency of agar slant and assimilatory property of gaseous and liquid hydrocarbons. Therefore, it is evidently considered to be a new species. It has been named *Corynebacterium alkanum*, ATCC 21194.

The taxonomical position of *Brevibacterium butanicum*, ATCC 21196, was determined in the same manner as described above. It belongs to the family Brevibacteriaceae because of rod cells, not being acid fast, no formation of trichomes, Gram-positive, no formation of endospores and non-branching cells. In this family it belongs to the genus Brevibacterium because of non-branching rods which do not form filaments. In this genus, it is considered to be closest to *Brevibacterium maris, Brevibacterium fuscum* and *Brevibacterium ammoniagenes* shown in the following table. However, as shown in the following table, it is different from *Brevibacterium maris* in size, color and elevation of colonies, production of hydrogen sulfide, and action to sucrose. It is different from *Brevibacterium fuscum* in size, color and elevation of colonies, and growth of stab culture and in bouillon culture. It is different from *Brevibacterium ammoniagenes* in size, elevation and color of colonies, and further, in the consistency of colonies, and the assimilatory property for gaseous and liquid hydrocarbons. Therefore, it is considered to be a new species and has been named *Brevibacterium butanicum*, ATCC 21196.

The taxonomical position of *Brevibacterium paraffinolyticum*, ATCC 21195 was determined in the same manner as described above. It belongs to the family Brevibacteriaceae because of rod cells, not being acid fast, no formation of trichomes, Gram-positive, no formation of endospores and non-branching cells. In this family, it belongs to the genus Brevibacterium because of non-branching rods which do not form filaments. In this genus, it is closest to *Brevibacterium maris*, *Brevibacterium fuscum* and *Brevibacterium ammoniagenes*. As shown in the following table, it is different from *Brevibacterium maris* in size, color, growth in bouillon culture, action to sucrose and production of hydrogen sulfide, and different from *Brevibacterium fuscum* in size and growth in gelatin stab culture. Moreover, it is different from *Brevibacterium ammoniagenes* in size, color and further in the consistency of colonies, and the assimilatory property for gaseous and liquid hydrocarbons. Therefore, it is considered to be a new species. It has been named *Brevibacterium paraffinolyticum*, ATCC 21195. *Brevibacterium butanicum*, ATCC 21196 and *Brevibacterium paraffinolyticum*, ATCC 21195, are considered to be different species from one another because they differ in their color, luster and utilizability of sugars.

Small amounts of other carbon sources which can be used in the fermentation medium include liquid hydrocarbons such as for example n-dodecane, n-tridecane, n-tetradecane, n-pentadecane, n-hexadecane, n-heptadecane and the like, carbohydrates, for example glucose, fructose, maltose, sucrose, starch hydrolysate, molasses, etc., and any other suitable carbon source such as glycerol, mannitol, sorbitol, organic acids, etc.

As a nitrogen source, various kinds of inorganic or organic salts or compounds, such as urea, ammonia, or ammonium salts such as ammonium chloride, ammonium sulfate, ammonium nitrate, ammonium phosphate, etc. or one or more than one amino acid mixed in combination, or natural substances containing nitrogen, such as corn steep liquor, yeast extract, meat extract, fish meal, peptone, bouillon, casein hydrolysates, fish soubles, rice bran extract, etc., may be employed. These substances may also be used either singly or in combinations of two or more.

Inorganic compounds which may be added to the culture medium in appropriate amounts include various phosphates, such as sodium phosphate, disodium monohydrogen phosphate, potassium dihydrogen phosphate, potassium monohydrogen phosphate, metallic ions such as magnesium sulfate, manganese sulfate, zinc sulfate, copper sulfate, iron sulfate or other iron salts, manganese chloride, cobalt chloride, nickel chloride, calcium chloride, calcium carbonate, boric acid, sodium molybdate, etc. It

TABLE II

| | Corynebacterium agropyric | Corynebacterium rathayi | Cornyebacterium alkanum, ATCC 21194 |
|---|---|---|---|
| Size | 0.4–0.6 x 0.6–1.1 micron | 0.6–0.75 x 0.75–1.5 micron | 0.5 x 2.5–5.0 micron. |
| Color in a bouillon agar slant culture. | Yellow | Yellow | Yellowish gray. |
| Gram-staining | Variable | Positive | Positive. |
| Utilizability of sugars: | | | |
| Glucose | Acid is produced | Acid is produced | Acid is produced. |
| Sucrose | | do | Do. |
| Lactose | Acid is produced | do | Do. |
| Decomposing ability of starch. | Weak | | None. |
| Gelatin stab culture | Not liquefied | Gradually liquefied after 7 weeks. | Not liquefied. |
| Color and growth in a bouillon agar plate culture. | Yellow, scanty, very viscous growth. | Yellow, slow growth | Yellowish gray, moderate growth, butyrous. |

TABLE III

| | Brevibacterium maris | Brevibacterium fuscum | Brevibacterium ammoniagenes | Brevibacterium paraffinolyticum, ATCC 21195 | Brevibacterium butanicum, ATCC 21196 |
|---|---|---|---|---|---|
| Size | 0.7–0.9 x 1.0–1.2 micron. | 0.6 x 1.5 micron | 0.8 x 1.4–1.7 micron | 0.5 x 2.5–5.0 micron | 0.5 x 2.5–5.0 micron. |
| Bouillon agar plate culture | Orange yellow, convex. | Brownis yellow, slightly convex. | Gray or faint yellow, flat. | Pale pink, convex to capitate. | Pale brown umbonate. |
| Gelatin stab culture | Not liquefied | Gradually liquefied | Not liquefied | Not liquefied | Not liquefied. |
| Bouillon culture | Form orange pellicle and sediment, no turbidity. | Form pellicle, sediment, no turbidity. | Moderate turbidity near the surface. | Growth of the surface is scanty, moderately clouding. | |
| Utilizability of sugars: | | | | | |
| Sucrose | None | | | Acid is produced | Acid is produced. |
| Lactose | do | | | do | Do. |
| Hydrogen sulfide | Not produced | | | Produced | Produced. |

As for the fermentation per se, either a synthetic culture medium or a natural nutrient medium is suitable as long as it contains the essential nutrients for the growth of the microorganism strain employed. Such nutrients are well known in the art and include substances such as a carbon source, a nitrogen source, inorganic compounds and the like which are utilized by the microorganism employed in the appropriate amounts.

The fermentation in connection with the present invention is conducted in an aqueous nutrient medium containing a gaseous hydrocarbon or a mixture of gaseous hydrocarbons as the main carbon source. The gaseous hydrocarbons employed include ethane, propane, and butane.

may also be necessary to add certain essential nutrients to the culture medium, depending upon the particular microorganism employed, such as amino acids, for example aspartic acid, threonine, methionine, etc. and/or vitamins, for example, biotin, thiamine, cobalamin, and the like.

Culturing is conducted under aerobic conditions at a culturing temperature of about 20°–50° C. and at a pH of about 4.0–9.0. The supply of gaseous hydrocarbon used is conducted as the gaseous state. Namely, it is supplied by an aeration method mixing it with air or oxygen. The kinds of gases employed include ethane, propane and butane. The concentration of gas is not particularly restricted.

Various fermentation methods which are employed in the conventional fermentation processes by using saccharine materials or liquid hydrocarbons as the main carbon source may be applied as they are. For example, the fermentation velocity can be remarkably accelerated by adding small amounts of non-utilized liquid hydrocarbons, or substances having a similar effect to the above, or surface active agents for increasing the dissolving rate of gaseous hydrocarbons in the culture medium.

After the completion of the fermentation, the microorganism cells may be separated from the culture liquor by conventional means.

The following examples are given merely as illustrative of the present invention and are not to be considered as limiting. Unless otherwise noted, the percentages therein are by weight.

EXAMPLE 1

2.7 l. of a culture medium consisting of 0.05% $KH_2PO_4$, 0.05% $Na_2HPO_4 \cdot 12H_2O$, 0.01% $MgSO_4 \cdot 7H_2O$, 0.001% $MnSO_4 \cdot 4H_2O$, 0.001% $FeSO_4 \cdot 7H_2O$, 0.001%

$ZnSO_4 \cdot 7H_2O$, 0.001% $CaCl_2 \cdot 2H_2O$, 10 γ/L of $H_3BO_3$, 10 γ/L of $Na_2MoO_4 \cdot 2H_2O$, 50 γ/L of $CuSO_4 \cdot 5H_2O$, 10 γ/L of $CoCl_2 \cdot 2H_2O$, 50 γ/L of $NiCl_2 \cdot 6H_2O$, 0.05% corn steep liquor and 0.2% $NH_4NO_3$ at pH 7.2 is introduced into a 5 l. jar fermenter and sterilized. Nocardia paraffinica, ATCC 21198 which was previously cultured with shaking in a culture medium containing 0.25% yeast extract, 0.5% meat extract, 0.5% peptone, 0.25% sodium chloride and 2.0% sorbitol at a pH of 7.2 for 24 hours is inoculated into said first culture medium in a ratio of 10% and cultured at 30° C. with agitation of about 600 r.p.m. while aerating with a 1 L/L per minute of mixed gas (the concentration of n-butane in the air is 1.3%) for 72 hours. The pH during culturing is maintained at 7.2 with a supply of ammonia water.

After the competion of culturing, the growth amount of the bacterium is 10 mg. as dried cells per ml. of the medium. 30 g. of cells is obtained by conducting a centrifugal separation, washing with water and drying.

EXAMPLE 2

Nocardia butanica, ATCC 21197 is cultured according to the same manner as described in Example 1 while aerating with a mixed gas (the concentration of propane in the air is 1.5%) for 72 hours, except that propane is used as a carbon source. At the completion of culturing, the growth amount of the bacterium as dried cells is 10 mg./ml. of the medium.

EXAMPLE 3

Nocardia paraffinica, ATCC 21199 is cultured according to the same manner as described in Example 1 except that the high concentration of n-butane is used as a carbon source, while aerating with a mixed gas (the concentration of n-butane in air is 20%). As a result, after 72 hours culturing, 25 mg. of the dried cells/ml. of the medium is produced.

EXAMPLE 4

Brevibacterium paraffinolyticum, ATCC 21195 is cultured according to the same manner as described in Example 3 by use of a culture medium consisting of 0.05% $KH_2PO_4$, 0.05% $Na_2HPO_4 \cdot 12H_2O$, 0.01% $MgSO_4 \cdot 7H_2O$, 0.001% $MnSO_4 \cdot 4H_2O$, 0.001% $FeSO_4 \cdot 7H_2O$, 0.001% $ZnSO_4 \cdot 7H_2O$, 0.001% $CaCl_2 \cdot 2H_2O$, 10 γ/L $H_3BO_3$, 10 γ/L of $Na_2MoO_4 \cdot 2H_2O$, 50 γ/L of $CuSO_4 \cdot 5H_2O$, 10 γ/L of $CoCl_2 \cdot 2H_2O$, 50 γ/L of $NiCl_2 \cdot 6H_2O$, 0.05% corn steep liquor and 0.2% $(NH_4)_2SO_4$, except that a mixed gas having 50% of butane concentration in air is used for aeration. As a result, after 96 hours of culturing, 4 mg. of the dried cells/ml. of the medium is produced.

EXTMPLE 5

Brevibacterium butanicum, ATCC 21196 is cultured according to the same manner as described in Example 4. As a result, after 96 hours of culturing, 5 mg. of the dried cells/ml. of the medium is produced.

EXAMPLE 6

Corynebacterium alkanum, ATCC 21194 is cultured according to the same manner as described in Example 4. After 96 hours of culturing, 3 mg. of the dried cells/ml. of the medium is produced.

Since modifications of this invention will be apparent to those skilled in the art, it is not desired to limit the invention to the exact constitution shown and described. Accordingly, all suitable modifications and equivalents may be resorted to which fall within the scope of the appended claims.

What is claimed:

1. A process for producing microorganism cells which comprises culturing a microorganism selected from the group consisting of Nocardia paraffinica ATCC 21198, Nocardia paraffinica ATCC 21199, Nocardia butanica ATCC 21197, Brevibactrium paraffinolyticum ATCC 21195, Brevibacterium butanicum ATCC 21196, Corynebacterium alkanum ATCC 21194 under aerobic conditions in an aqueous nutrient medium containing at least one gaseous hydrocarbon of $C_2$ to $C_4$ as the main carbon source, and isolating and recovering the resultant microorganism cells thus produced.

2. The process of claim 1, wherein the microorganism is Nocardia paraffinica, ATCC 21198.

3. The process of claim 1, wherein the microorganism is Nocardia paraffinica, ATCC 21199.

4. The process of claim 1, wherein the microorganism is Nocardia butanica, ATCC 21197.

5. The process of claim 1, wherein the microorganism is Brevibacterium paraffinolyticum, ATCC 21195.

6. The process of claim 1, wherein the microorganism is Brevibacterium butanicum, ATCC 21196.

7. The process of claim 1, wherein the microorganism is Corynebactrium alkanum, ATCC 21194.

8. The process of claim 1, whereas the gaseous hydrocarbon is selected from the group consisting of ethane, propane and n-butane.

9. The process of claim 1, wherein the microorganism is cultured under aerobic conditions at a temperature of about 20° to 50° C. and a pH of about 4 to 9.

References Cited

UNITED STATES PATENTS

| | | | |
|---|---|---|---|
| 3,384,491 | 5/1968 | Guenther et al. | 99—9 |
| 3,355,296 | 11/1967 | Perkins et al. | 99—14 |
| 3,649,459 | 3/1972 | Wolnak et al. | 195—96 |

LIONEL M. SHAPIRO, Primary Examiner

R. B. PENLAND, Assistant Examiner

UNITED STATES PATENT OFFICE
CERTIFICATE OF CORRECTION

Patent No. 3,751,337  Dated August 7, 1973

Inventor(s) Katsunobu TANAKA, Kazuo KIMURA and Masaki YAMAMOTO

It is certified that error appears in the above-identified patent and that said Letters Patent are hereby corrected as shown below:

In Column 1,

After line 9, insert

--Claims priority, application Japan, March 9, 1968
14945/68--

Signed and sealed this 1st day of January 1974.

(SEAL)
Attest:

EDWARD M. FLETCHER, JR.　　　　RENE D. TEGTMEYER
Attesting Officer　　　　　　　　Acting Commissioner of Patents